April 20, 1948.                J. V. TERCHO                 2,439,955
                    OIL-RING AND FLOOD-LUBRICATED BEARING
                           Filed April 3, 1945
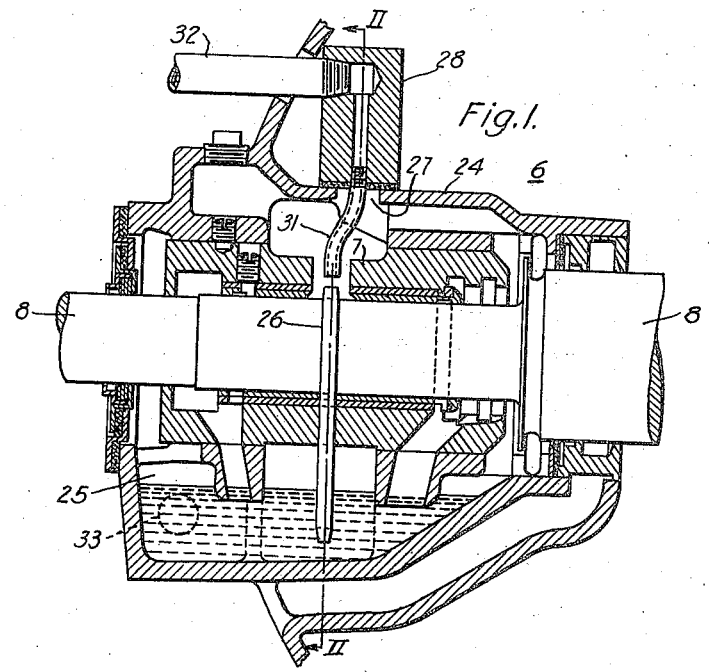
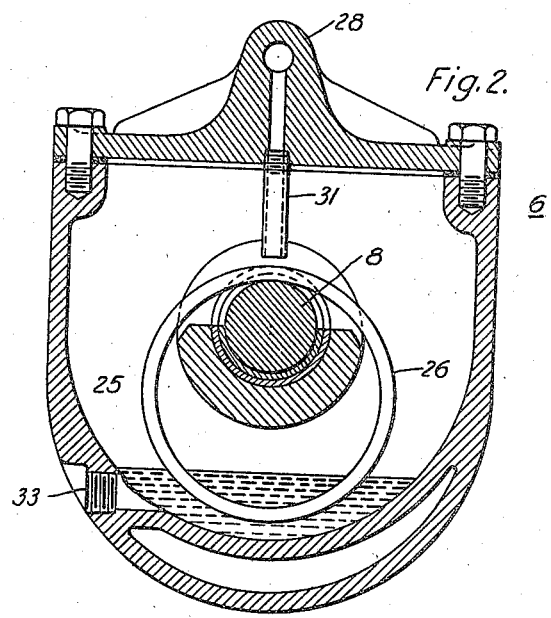
WITNESSES:
INVENTOR
John V. Tercho
BY
ATTORNEY Patented Apr. 20, 1948

2,439,955

UNITED STATES PATENT OFFICE 2,439,955

OIL-RING AND FLOOD-LUBRICATED BEARING

John V. Tercho, Turtle Creek, Pa., assignor to Westinghouse Electric Corporation, East Pittsburgh, Pa., a corporation of Pennsylvania Application April 3, 1945, Serial No. 586,290

2 Claims. (Cl. 308—128)

My present invention relates to a combination oil-ring bearing and flood-lubrication bearing, such as is particularly useful in the journalling of the approximately horizontal rotating shafts of electric motors and other machinery on shipboard, or in other locations where oil-pressure means are provided for constantly feeding oil to the bearing while the journalled shaft is in normal use, this bearing-lubricating system being known as a flood-lubricating system. On shipboard, such a flood-lubricating system is generally required, because the pitching of the ship results in a tilting of the shaft, which may momentarily interfere with self-lubricating means, particularly oil-ring lubrication, for lifting oil from an oil-chamber in the bearing itself, to the journalled portion of the shaft, which has to be lubricated.

Heretofore, flood-lubricated bearings have generally required a special bearing-design, which was different from the more common and generally used ring-lubricated bearings. In these specially designed, flood-lubricated bearings of the prior art, the oil-rings have commonly been omitted, as being unnecessary so long as the flood-lubrication means does not fail.

An object of my present invention is to provide means whereby a conventional ring-lubricated bearing-design may be readily converted into a flood-lubricated design, thereby providing the dual advantage of the lower cost which is obtainable by taking advantage of the quantity-production of the old design of the conventional oil-ring bearing, and at the same time providing a flood-lubricated bearing which also has a stand-by ring-type lubrication which is available, for what it is worth, in the event of a failure of the flood-lubricating system. The ring-type lubrication is usually not considered sufficiently reliable, for some shipboard uses, because of the possibility that the oil-ring may stop rotating with the shaft, when the shaft tilts up at too great an angle, because of the rolling of the ship. Nevertheless, if the preferred flood-lubricating means should fail, a bearing which also has a ring-lubrication will have an advantage because the shaft will not always be tilted at such an angle that the oil-ring cannot function.

A more particular object of my present invention is to provide a new form of slot-combination, which can be substituted for the conventional slot-cover of a ring-lubricated sleeve-bearing, for converting such a bearing into a flood-lubricated bearing.

With the foregoing and other objects in view, my invention consists in the combinations, apparatus, parts, and methods hereinafter described and claimed, and illustrated in the accompanying drawing, wherein:

Figure 1 is a longitudinal sectional view of a bearing embodying my invention, and Fig. 2 is a cross-sectional view on the plane indicated by the line II—II in Fig. 1.

I have illustrated my invention in a bearing 6, comprising a sleeve-bearing 7 for journalling an approximately horizontal rotating shaft 8. The bearing has a housing 24, having an oil-chamber 25 in its lower portion. The bearing has an oil-ring 26, which rides on the shaft 8 and carries oil from the oil-chamber 25 to the top of the shaft and hence to the top of the journal. The bearing-housing 24 has a slot 27 through which the oil-ring 26 may be inserted or removed.

In accordance with my present invention, I provide a special removable slot-cover 28, for covering the slot 27. The slot-cover 28 is provided with a downwardly depending oil-pipe 31, which extends into close juxtaposition to the top of the oil-ring 26, so as to serve as a keeper for preventing the oil-ring from jumping out of place. The top of the slot-cover 28 is provided with an oil-supply coupling-means 32, for feeding oil, under pressure, through said oil-pipe 31, and discharging it over the oil-ring 26, for providing flood-lubrication for the bearing.

The oil-overflow drains down into the oil-chamber 25 of the bearing, from which it is withdrawn by any suitable drain-line or oil-drain coupling-means 33, which maintains a substantially constant oil-level in the oil-chamber 25. In operation, oil is continuously supplied, through the oil-supply coupling-means 32, for the flood-lubrication of the bearing, so that an abundance of the lubricating-oil is provided, independently of the operation of the oil-ring, whenever the machine is in normal use. However, normal oil-level is maintained in the oil-chamber 25, by reason of the particular nature or disposition of the drain-line 33, so that, in the event that there should be a failure of the means (not shown) for supplying oil to the oil-supply coupling-means 32, there will be a reservoir of oil available, in the oil-chamber 25, together with an oil-ring 26 available for providing lubrication at such times as the shaft may be sufficiently horizontal. It will be observed that I have achieved this advantage in a construction which utilizes a standard oil-ring bearing, which has been changed only by the substitution of a different form of slot-cover 28.

It will be obvious that my invention is susceptible of embodiment in several different specific forms, and I desire that the appended claims shall be accorded the broadest construction consistent with their language.

I claim as my invention:

1. A combination oil-ring bearing and flood-lubrication bearing, comprising a sleeve-bearing for journalling an approximately horizontal rotating shaft, said sleeve-bearing having a housing having an oil-chamber in its lower portion and having a slot in its upper portion, an oil-ring for lifting oil from the oil-chamber to the top of the journal, the slot being so shaped and dimensioned that the oil-ring may be inserted and removed therethrough, a removable slot-cover having a downwardly depending oil-pipe extending into close juxtaposition to the top of the oil-ring, an oil-supply coupling-means for feeding oil through said oil-pipe, and an oil-overflow drain-line from said oil-chamber.

2. A combination oil-ring bearing and flood-lubrication bearing, comprising a sleeve-bearing for journalling an approximately horizontal rotating shaft, said sleeve-bearing having a housing having an oil-chamber in its lower portion and having a top-opening in its upper portion, an oil-ring for lifting oil from the oil-chamber to the top of the journal, the top-opening being so shaped and dimensioned that the oil-ring may be inserted and removed therethrough, and a removable opening-closing means for closing said top-opening, said opening-closing means having a downwardly depending oil-pipe extending into close juxtaposition to the top of the oil-ring, said opening-closing means further having an oil-supply coupling-means for feeding oil through said oil-pipe, and said oil-chamber having an oil-drain coupling-means for maintaining a substantially constant oil-level in said oil-chamber.

JOHN V. TERCHO.

REFERENCES CITED

The following references are of record in the file of this patent:

UNITED STATES PATENTS

| Number | Name | Date |
|---|---|---|
| 1,309,113 | Bentley | July 5, 1919 |

FOREIGN PATENTS

| Number | Country | Date |
|---|---|---|
| 75,479 | Sweden | Dec. 18, 1929 |